INVENTOR.
George H. Hare
BY Karl H. Sommermeyer
ATT'Y

Nov. 15, 1966 G. H. HARE 3,286,190

ELECTROMECHANICAL DELAY LINE HAVING PROFILED SENSITIVITY TRANSDUCER FOR CORRECTING PULSE DISPERSION

Filed Aug. 13, 1963 6 Sheets-Sheet 2

INVENTOR.
George H. Hare

BY Karl H. Sommermeyer
ATT'Y

INVENTOR.
George H. Hare
BY Karl H. Sommermeyer
ATT'Y

INVENTOR.
George H. Hare
BY Karl H. Sommermeyer
ATT'Y

Nov. 15, 1966 G. H. HARE 3,286,190

ELECTROMECHANICAL DELAY LINE HAVING PROFILED SENSITIVITY TRANSDUCER FOR CORRECTING PULSE DISPERSION

Filed Aug. 13, 1963 6 Sheets-Sheet 5

INVENTOR.
George H. Hare
BY Karl H. Sommermeyer
ATT'Y

Nov. 15, 1966 G. H. HARE 3,286,190

ELECTROMECHANICAL DELAY LINE HAVING PROFILED SENSITIVITY TRANSDUCER FOR CORRECTING PULSE DISPERSION

Filed Aug. 13, 1963 6 Sheets-Sheet 6

INVENTOR.
George H. Hare
BY Karl H. Sommermeyer
ATT'Y

United States Patent Office 3,286,190

Patented Nov. 15, 1966

3,286,190

ELECTROMECHANICAL DELAY LINE HAVING PROFILED SENSITIVITY TRANSDUCER FOR CORRECTING PULSE DISPERSION

George H. Hare, Oakland, Calif., assignor, by mesne assignments, to Friden, Inc., San Leandro, Calif., a corporation of Delaware Filed Aug. 13, 1963, Ser. No. 301,850

6 Claims. (Cl. 333—30)

The present invention relates to mechanical, signal, delay lines, and to the control of the shape of the output signals therefrom.

Delay lines are employed in electric systems for controlling the time of the presentation of a signal, for preserving one signal for comparison with a later signal, for echo effects, and for data storage in computers. Acoustic delay lines present the advantage of long delay times in compact structures, but heretofore they have presented difficulties in that they distorted the signals. Delay lines may be provided with input and output transducers of magnetostrictive construction.

An object of my present invention is to provide a delay line with a transducer that corrects for the distortion imposed on a signal by the delay line.

A further object is to provide an output transducer for a delay line which derives a short, sharp output siganl from an extended signal of known wave shape.

A further object of the invention is the provision of an improved magnetostrictive transducer including a coil, the coupling of which to the magnetostrictive member varies along said coil according to a predetermined function, for providing resonant responses to the component frequencies of a signal, and for imposing predetermined phase relationships upon said responses.

A further object is the provision of a delay line with magnetostrictive transducers in which the sensitivity of one of these transducers is profiled to alter a signal in a manner opposite to the alteration imposed by the mechanical portions of the signal path.

A further object is the provision of a delay line having a transducer with a nonuniform turn density in which the pattern of the turn density is matched to the signal distortion characteristics of the line.

Further objects include the provision of an improved acoustic delay line, the provision of an improved transducer therefor, and the provision of an improved signal transducer.

In accordance with this invention I make a pickup coil having a length substantially equal to the length of the acoustic pulse at the output end (about two inches for a typical delay line) and provide it with a signal amplitude output contribution from each small axial length proportional to the observed signal amplitude there.

These and other objects and advantages of the invention will be apparent from the following description of specific embodiments thereof taken in connection with the accompanying drawings wherein.

Figure 2:
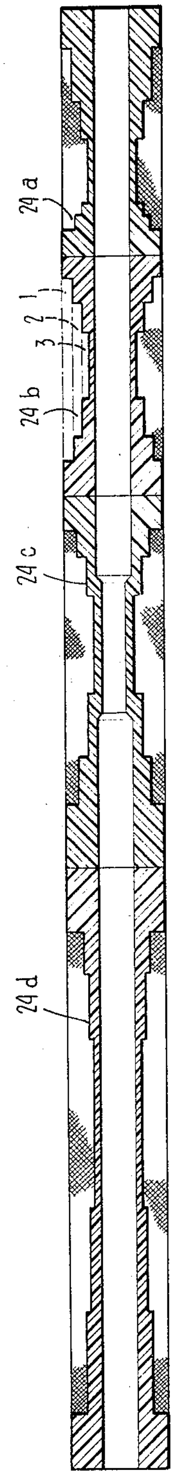
FIG. 2 is an enlarged longitudinal section of a transducer coil used in the delay line of FIG. 1.
Figure 1:
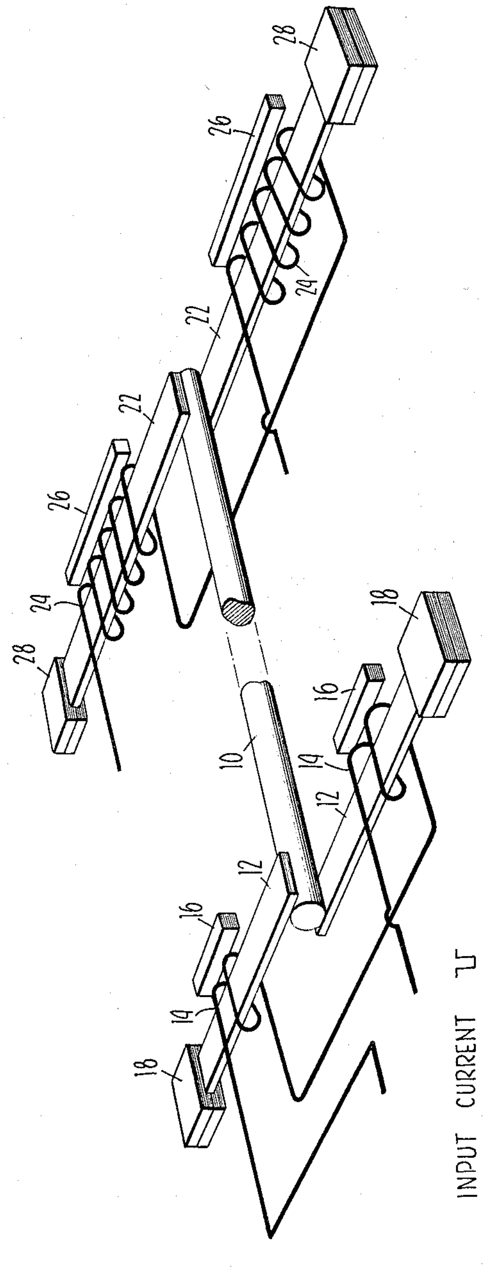
FIG. 1 is a partially diagrammatic view showing a delay line embodying my present invention.

In the specific embodiment of FIGS. 1 and 2, a wire line 10, composed of a nickel iron alloy known as "Nispan," substantially .030 in diameter, has a pair of thin magnetostrictive ribbons 12 substantially .005 by .025 welded to one end thereof. These two ribbons are attached at opposite points of the cylindrical surface of the wire 10 and extend at right angles to the wire 10. A pair of transducer coils 14 encircle the ribbons 12 and are connected in series with such polarity that their magnetostrictive effects add for imposing a couple on the wire 10. Magnets 16 placed close to the coils 14 and parallel thereto provide bias fields. The coils 14 are short in that they extend only a short distance along the ribbons 12, for example, a tenth of an inch. The ribbons 12 extend beyond the coils 14 and their ends are clamped in rubber pads 18 for absorbing signals and thereby preventing reflections from those ends. The wire 10 is about 45 feet long and is arranged in a coil of substantially nine inches mean diameter in a known manner, similar to the construction shown in FIG. 7 of U.S. Patent No. 3,011,-136 to G. G. Scarrott.

The right-hand end of the wire 10, as seen in FIG. 1, has welded thereto one end of each of two magnetostrictive ribbons 22 similar to the ribbons 12, the other ends of which are clamped between rubber pads 28, similar to the absorbing pads 18. Coils 24 surround the ribbons 22 and magnets 26 lie alongside them for providing bias fields. Each of the coils 24 is approximately two inches long and each is constructed as shown in FIG. 2.

The coil 24 (FIG. 2) includes four sections 24–*a*, 24–*b*, 24–*c* and 24–*d*, each wound on a separate bobbin. Each coil section has its greatest number of layers of winding, and therefore the greatest turn density near its central portion, and has fewer layers and therefore a lower turn density near its ends. Each coil is wound with a size of wire selected for distributing a predetermined number of turns evenly in the winding space. Each coil section is connected in the circuit in an opposite sense to that of its immediate neighbor. The whole composite coil 24 is profiled to have a sensitivity function similar to the curve 33 in FIG. 4. The right-hand end of the curve 33 corresponds to the right-hand end of the coil 24 in FIG. 2, which is the end farthest from the source of the signal.

The sensitivity function represented by the curve 33 may be determined by tests conducted on the delay line itself. The electric current applied to the input coils 14 in the delay line shown in FIG. 1 may consist of a short pulse such as shown by the curve 36 in FIG. 3, which curve depicts the current in the coils 14 as a function of time, time increasing to the right. The application of this current to the coils 14 causes longitudinal pulses of mechanical strain to propagate along the ribbons 12 in both directions from the coil. The waves moving out toward the rubber pads 18 are absorbed there. The other pulses move toward the wire 10, reach that wire in phase with each other, and produce a torsional strain wave that travels to the right in the wire 10. This torsional wave, upon reaching the right-hand end of the wire 10, produces longitudinal waves in the ribbons 22 which pass along those ribbons through the coils 24 and to the pads 28 where they are absorbed.

The mechanical wave, passing through the portion of the ribbon 22 that is magnetized by the bias magnet 26, alters the magnetic permeability of that portion of the ribbon and so causes the magnetic flux within the coil to change and thereby induce a voltage in the coil 24.

The action of the coil 14 and magnetostrictive ribbon 12 is to differentiate the signal electric current wave 36 but the derivative is considerably rounded. The mechanical pulse, as it leaves the launching coil 14, will exhibit a strain versus time relationship substantially as shown by the curve 37 in FIG. 3. The subsequent transmission of the signal from the ribbon 22 to the coil 24 again differentiates the signal and, if the strain wave within the coil 24 were of the form shown by curve 37, the voltage induced by that signal in the coil 24 would have a waveform substantially as shown by curve 38 in FIG. 3. However, the wire 10 and the ribbons 12 and 22 impose distortions on the signal. A part of the distortion consists of dispersion, that is, the phenomena of the lower frequency components traveling faster and reaching the output coil ahead of the higher frequency components. The distortion may also result from multiple reflections and mechanical loading at the mounting points.

Figures 3, 4:
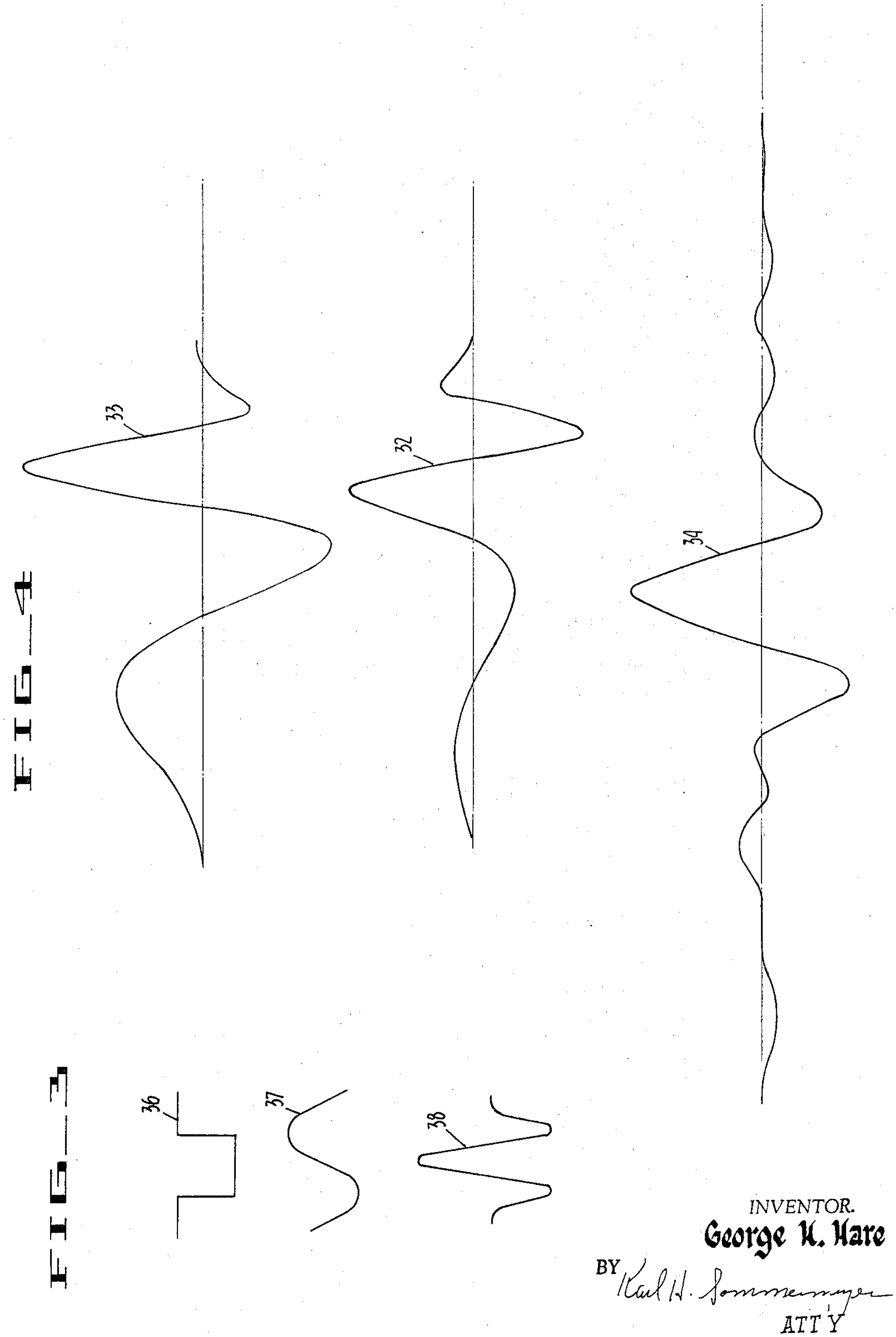
FIGS. 3 and 4 are graphical representations of signal waveforms.
Figure 6:
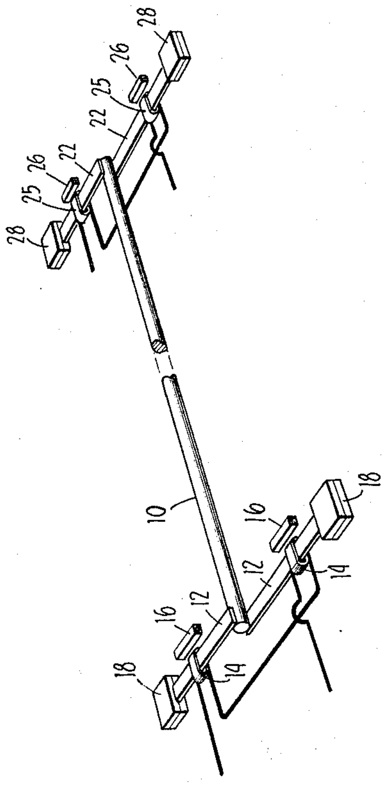
FIG. 6 is a diagrammatic representation of a delay line similar to that shown in FIG. 1, used for measuring design parameters for the device of FIG. 1.

The delay line was tested as shown in FIG. 6. The line there is the same delay line as is shown in FIG. 1 except that it has short output coils 25, substantially like the input coils 14. In FIG. 4, the curve 32 is a copy of an oscilloscope trace of the output voltage obtained from the test arrangement of FIG. 6 with an input current pulse as shown by curve 36 of FIG. 3. Curve 32 shows the variation of voltage with time, time increasing from right to left in this diagram.

Curve 33 is the computed integral of curve 32 shown with the same time scale as curve 32. Since one action of the output coil is to produce an electric signal that is the derivative of the pulse wave, curve 33 shows substantially the shape of the mechanical wave when it passes the output coil. The fact that the curves 32 and 33 differ materially from the curves 37 and 38 is the result of the distortions previously mentioned. Although the mechanical wave of a 1.1 microsecond pulse is launched by the coils 14 in the ribbons 12 as a wave about .15 inch long, it appears as a wave about two inches long in the ribbons 22. Thus, the curve 33 may be viewed as a space plot, that is, as a diagram of the mechanical wave in the ribbons 22 at one instant, the right-hand end of the curve corresponding to the part of the wave that is leading, that is, that is farthest from the source.

Coil 24, shown in FIG. 2, was designed and constructed to have turn densities varying according to the curve 33 in FIG. 4. The construction was determined graphically from the diagram of FIG. 5. The coil sections 24–*a*, 24–*b*, 24–*c* and 24–*d* correspond respectively to the negative and positive swings *a, b, c* and *d* of the curve 33.

Figure 5:
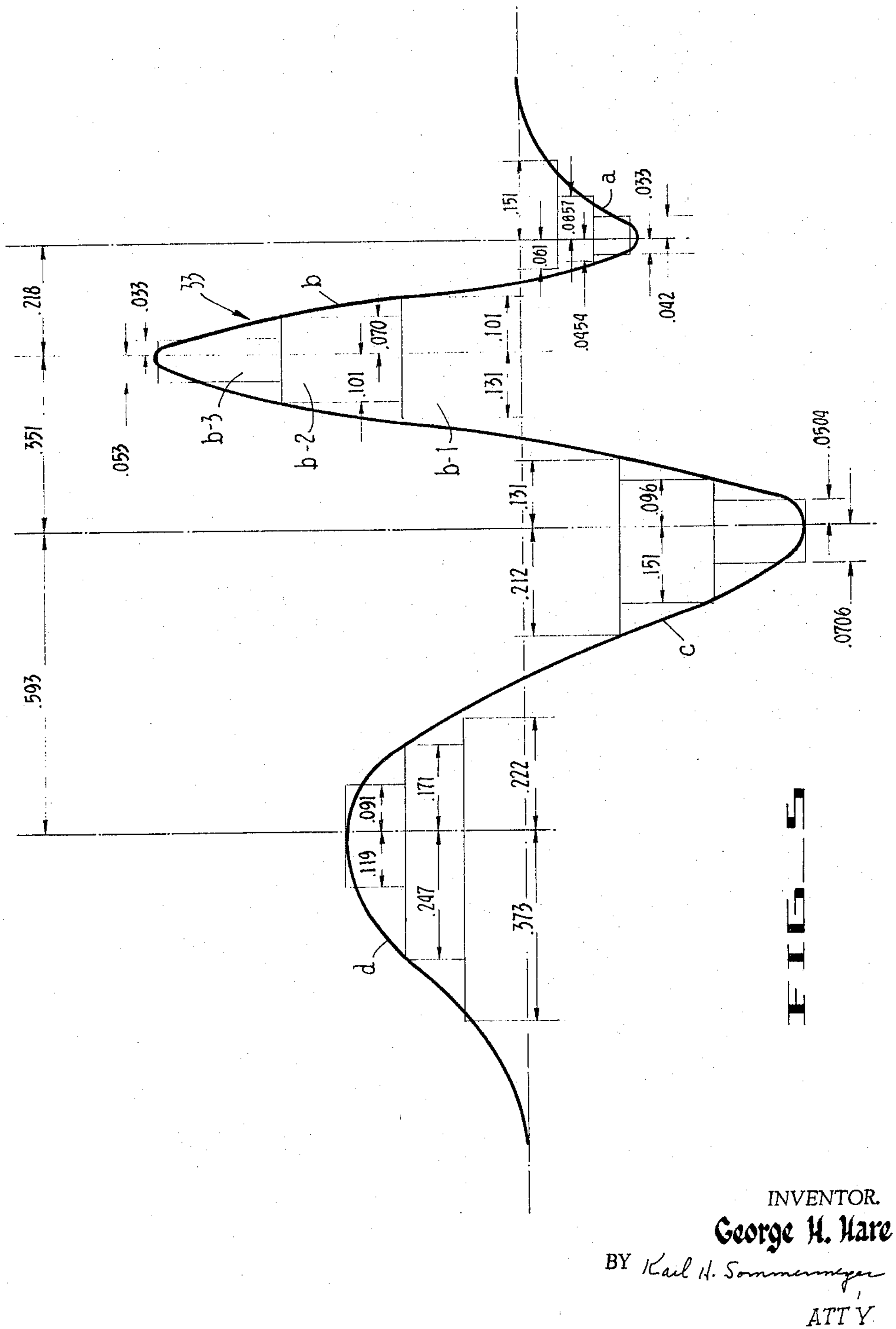
FIG. 5 is a graphical construction showing how the construction of the coil of FIG. 2 is based on the signal waveform.

In FIG. 5, rectangular blocks *b*–1, *b*–2, and *b*–3 were drawn to approximately occupy the space enclosed by the bight *b* of the curve 33, and blocks were also drawn in the other bights *a, c* and *d* similarly. The heights of these blocks are proportioned to the desired sensitivity, or turn-density, the widths are proportioned to the desired extent of the coil portions along the ribbons 22, and the areas of the blocks are proportioned to number of turns. Thus for block *b*–3, 37 turns were wound in the portion 3 of coil section 24–*b* in FIG. 2, for block *b*–2, 71 turns were wound in portion 2, and for block *b*–1, 96 turns were wound in portion 1. The individual coil sections are not symmetrical, but rather the portions, such as 1, 2 and 3 of section 24–*b*, are off-center to correspond to the unsymmetrical shapes of the bights of the curve 33 (FIG. 5). The coil sections 24–*b* and 24–*d* are connected in the opposite sense to sections 24–*a* and 24–*c* to match the positive and negative values of the curve 33.

With coil 24 of FIGS. 1 and 2 thus constructed with a distributed sensitivity to match the waveform of the mechanical pulse within the coil, the voltage output pulse from the coils 24 is shown by curve 34 in FIG. 4 which is drawn to the same scale as curve 32. That is, the current pulse 36 (FIG. 3) applied to the input coils 14 in FIG. 1 launches a mechanical wave 37, which changes to the form 33 (FIG. 4) by the time it reaches the pickup coils 24, and produces in those coils the output voltage wave 34. As can be seen in FIG. 4 this total output signal 34 is substantially twice as long as the output signal 32 obtained with the apparatus of FIG. 6 because the pulse shown by curve 34 continues from the time the leading edge of the mechanical strain wave, shown by curve 32, enters one end of the long coil 24 and continues until the trailing edge of the wave leaves the other end of the coil.

The voltage output wave shown by the curve 32 in FIG. 4 was observed with the apparatus of FIG. 6 with an input current pulse having substantially the form shown by curve 36 in FIG. 3 and a duration of 1.1 microseconds (millionth of a second). The output coils 24 of the apparatus of FIG. 1 were profiled to a sensitivity function to match the curve 33, which was computed from curve 32. The observed output voltage shown by curve 34 was then obtained from the coils 24 in the apparatus of FIG. 1 with an input current to coils 14 having a wave form substantially like that of curve 36, but with a duration of 1.6 microseconds. Longer and shorter input pulses produced output waveforms that were less symmetrical than that of curve 34. These values will be explained presently.

The basis of the operation of this phase correction or pulse sharpening transducer is as follows: An extremely short pulse (ideally a pulse of zero duration, called an "impulse," but practically a short pulse such as is shown by the curve 36 in FIG. 3) has a broad and continuous spectrum of frequencies. If such a pulse traveling as a mechanical wave on a magnetostrictive line is detected by a pickup coil profiled so that its turn density, or sensitivity, varies along its length according to a single cosine function, that coil will show a strong response, or resonance, to the frequency that corresponds to the wave length of the profile of its winding. If the coil is long compared to the wave length, so that its profile contains many cycles of its cosine function and if the mechanical wave contains many cycles of that frequency, the coil will exhibit a sharp selectivity, and in the mathematically extreme case of an infinitely long coil and an infinitely long signal, the response would consist of only the one frequency corresponding to the wave length of its profile function.

If the turn density of such a coil is profiled to match a function consisting of the sum of two different cosine functions of different wave lengths, the coil will respond strongly to the two frequencies corresponding to those wave lengths. If the two cosine functions in the coil profile have a zero phase difference, they will pick up the two frequencies from the mechanical wave in the same phase relationship as they exist in that wave. If those two frequencies in the profile of the coil winding have a phase difference, the profiled coil will impose that phase difference on the output signal, that is, on the voltage output from the coil, adding it to, or subtracting it from, the phase difference between those two frequencies in the signal as the signal existed on the magnetostrictive wire within the coil. If those two cosine functions in the coil winding profile have the same phase difference as the two corresponding frequencies have in the mechanical wave, those two frequencies will appear in the output in phase with each other, that is, with zero phase difference. These resonance frequencies and their phase relationships in the output signal will be sharp only for a coil and a signal that are both many wave lengths long, and they are somewhat broadened or blunted by a shorter coil and by a shorter signal.

A single valued function, such as the curve 33 of FIG. 4, can be resolved into a Fourier series of harmonic cosine functions, each of a particular amplitude and phase. If a pickup coil, such as the coil 24, has its sensitivity profiled to the curve 33, the sensitivity function of the coil will contain the same frequency components, in the same phase relationships and relative amplitudes, as those frequency components appear in the mechanical strain wave depicted by the curve 33. Consequently, such a coil, because it will match the mechanical strain wave, will tend to produce a resonant output with all of the component frequencies essentially in phase. If all of the component frequencies could thus be brought precisely into phase, the resulting output voltage wave would have substantially the shape of the ideal output curve 38 in FIG. 3. The fact that the curve 34 is not completely ideal is attributable, first, to the circumstance that both the signal and the coil may be short compared to some wave lengths of the component frequencies so that resonances and phase control may not be sharp, and, second, to the circumstance that the coil 24 itself fails to have a sensitivity function that is precisely the same as the curve 33. The sensitivity function of coil 24 differs from the curve 33, because the coils are designed to be wound in steps with wires of standard wire gauge sizes, because all parts of the coil are not at equal distances from the magnetostrictive wire, and perhaps also because of fringing effects at the ends of the coil segments. It is believed that this same lack of sharp resonances and lack of sharp phase control in at least some of the component frequencies, and these same blurring, or rounding-off, effects in the profile of the coil sensitivity are responsible for the fact, previously mentioned, that a coil profiled to match the wave from a 1.1 microsecond input signal, works best with a 1.6 microsecond input signal. However, there should be only a small difference in the optimum sensitivity profile of the output coil 24 for these two pulse lengths. A current pulse of 1.1 microseconds in the input coils 14 produces a mechanical wave about .15 inch long in the magnetostrictive ribbons 12, and a pulse of 1.6 microseconds produces a wave about .25 inch long. But the lengthening of the signal wave by distortion during its travel to the ribbons 22 should be the same for these two signals. So, at the output coil, although each of these signals is about two inches long, the first signal is still only about 0.1 inch shorter than the second. Furthermore, since it is known that the optimum length of input pulse may not be the same as the length of input pulse used for selecting the profile of the coil, this condition can be measured and then allowed for in the design and construction of the profiled coil.

The actual output waveform shown by the curve 34 in FIG. 4 is greatly improved over that of curve 32 in that it is more symmetrical and has a greater ratio between the amplitude of the prominent central peak and the amplitude of other parts of the wave. Since the input pulse that produced curve 34 is longer than the one that produced curve 32, the approximately equal widths of the peaks of the two curves show also that curve 34 provides better resolution, as in a delay line functioning as a memory or storage device in a digital computer.

Figure 7:
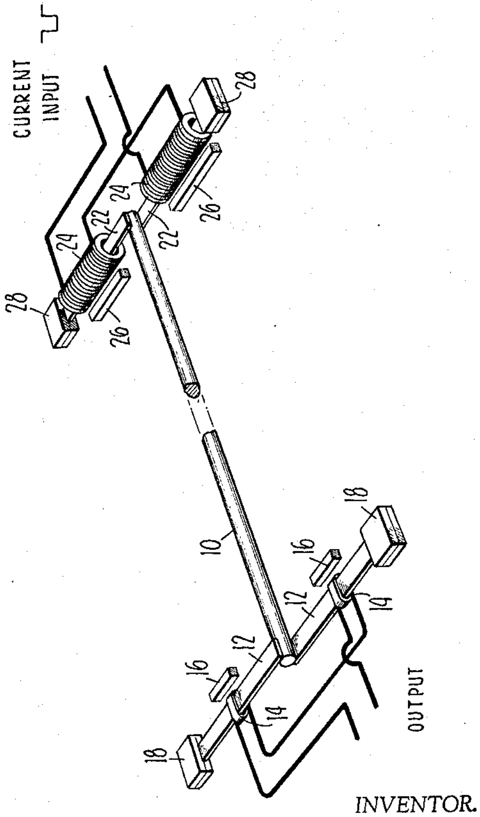
FIG. 7 is a diagrammatic view showing the delay line of FIG. 1 operating in a different manner.

In the system of FIG. 1, the relationship between the electric signals in the coils 14 to the electric signals in the coils 24 is reciprocal. Accordingly, the input signal shown by the curve 36 in FIG. 3, if applied to the profiled coil 24 as shown in FIG. 7, will produce an output voltage in the short coils 14 of the waveform shown by the curve 34 in FIG. 4. A short electric pulse applied to the profiled coil 24 produces in the magnetostrictive wire a mechanical strain wave of the same shape as the sensitivity profile of the coil, as shown by curve 33 in FIG. 4. In this strain pattern the lower frequencies are contained in the right-hand portion of the curve and the higher frequencies in the left-hand portion. This strain pattern propagates two waves. The one moving right relative to curve 33 in FIG. 4 will be absorbed by pads 28, FIG. 1. The other wave, moving left from curve 33, will have its lower frequencies in the trailing part. But, the lower frequencies travel faster than the higher frequencies so that by the time the mechanical strain signal reaches the coil 14, the signal has coalesced into approximately the form shown by the curve 37 and produces an output electric voltage in the short coils 14 similar to the waveform 38 in FIG. 3.

Figure 12:
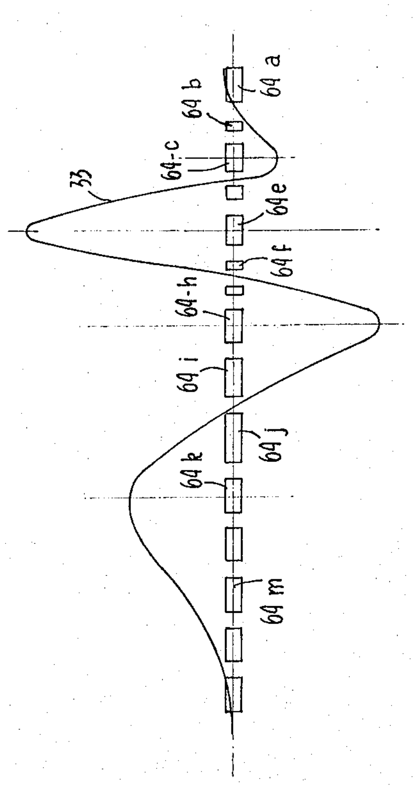
FIG. 12 is a graphical construction showing the manner of laying out and locating the coil sections of an alternate transducer construction and matching them to a known signal wave shape.

Alternatively a profiled transducer may employ a plurality of similar coil sections, each connected to an electric control element, the transmission characteristics of which are adjustable, such as a transistor amplifier. FIG. 12 shows the manner of laying out such a coil 64 to match the mechanical signal wave. There, the curve 33 is the same as the curve 33 in FIG. 4, showing the waveform of the mechanical signal that reaches the output coils 24 in the delay line of FIG. 1. As a space plot, this waveform represents a signal approximately two inches long. Most of the coil sections are approximately one-tenth of an inch long. First, an individual coil section is laid out in alignment with each positive and negative peak of the curve 33 in FIG. 12. Thus sections **64–*c* and 64–*h* are aligned with the two negative peaks and sections 64–*e* and 64–*k* are aligned with the two positive peaks. Additional coil sections are laid out to scale to fill in the remaining space, with no coils overlying the zero points of the curve 33**. The individual coil sections need not touch because each is effective somewhat beyond its own end, but preferably the spaces between coils do not exceed about .050 inch except near the zero points of the curve.

Figure 8:
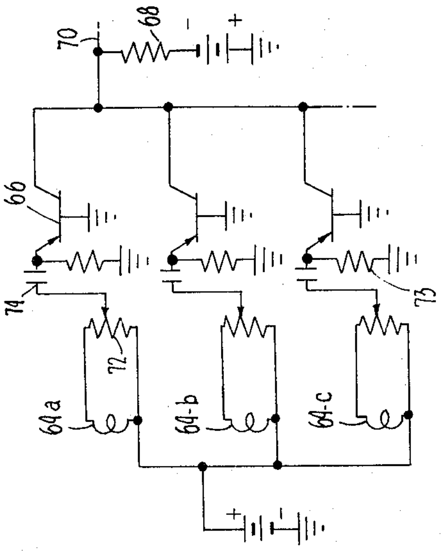
FIGS. 8, 9, 10 and 11 are schematic circuit diagrams showing alternate constructions for using the transducer of FIG. 12.

A pair of coils 64 may then be constructed according to the layout of FIG. 12 and mounted in the system of FIG. 1 in the position therein of coils 24. As shown in FIG. 8, a plurality of individually adjustable, transistor amplifiers may then selectively amplify the outputs of the several sections of the coil 64 and deliver all their outputs to the same output circuit. Each amplifier includes a transistor 66, having its collector connected both to a common load resistor 68 and to an output connection 70. Each transistor 66 has its emitter connected to a bias resistor 73 and connected also through a condenser 74 to an input potentiometer 72 which is connected across a coil section, such as **64–*a***.

For example, for use with a coil section having an impedance of about 200 ohms at 500,000 cycles per second, the transistors 66 may be of the "small signal" type, having an input signal range of about 0.1 to 10 millivolts, and an alpha cutoff frequency of about five megacycles per second. Each potentiometer 72 may have a resistance of 1000 ohms, and each condenser 74 may have a capacity of .03 microfarad. Such transistor amplifiers, employing the common base connection, show very little response to changes of collector voltage and so operate substantially independently of each other even with the common load resistor.

Each potentiometer 72 is adjusted to provide a transmission from the voltage of its coil section, such as **64–*a*, to output current of its collector that is substantially proportional to the height of the curve 33** at the position of the coil section. Further fine adjustments can be made while watching the outputs of repetitive pulses on an oscilloscope.

Figure 9:
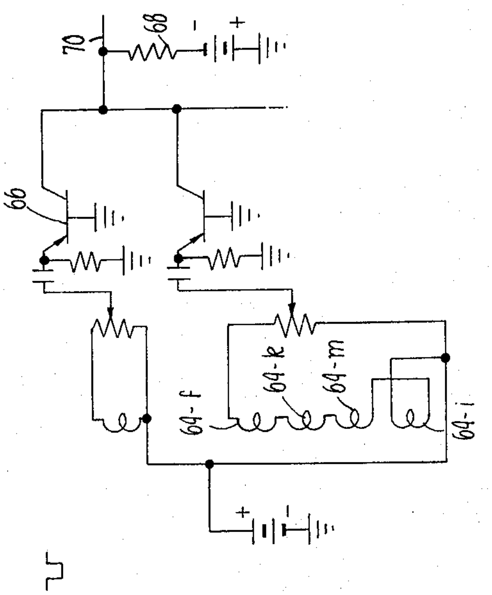

For greatest flexibility, each of the individual coil sections **64–*a*, 64–*b*, 64–*c*, etc., may be connected to a separate one of the several transistor amplifiers, as shown in FIG. 8. Alternatively two or more such sections may be connected in series for driving a single amplifier, as shown in FIG. 9, for example, for the coils 64–*f*, 64–*k*, 64–*m* and 64–*i*. It is to be noted in FIG. 12 that coil sections 64–*f*, 64–*k* and 64–*m* are all aligned with positive portions of the curve 33 and so are connected in series in the same sense, but that coil 64–*i*, which is aligned with the negative portion of the curve 33**, is connected in the series circuit in the opposite sense to the other coils, as indicated in FIG. 9.

Figure 11:
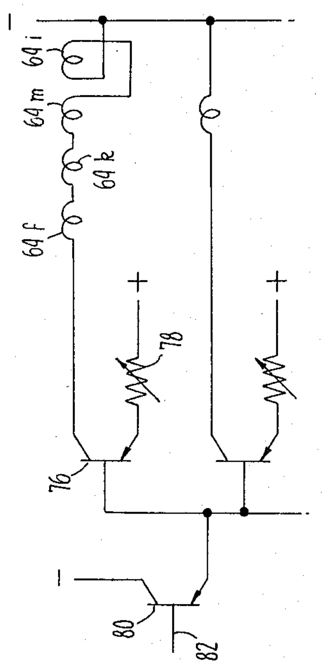
Figure 10:
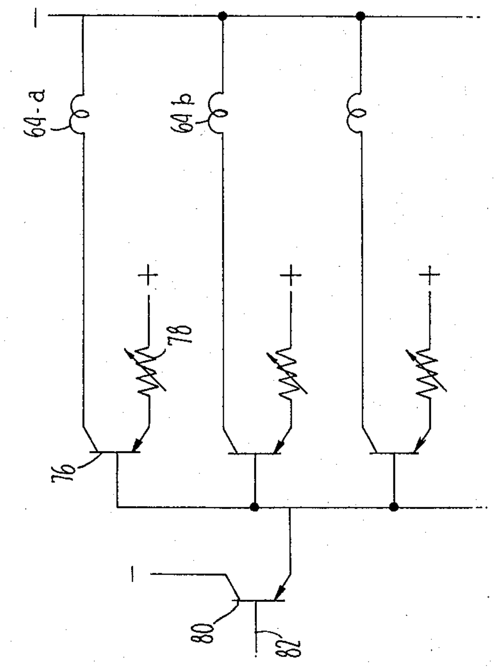

The composite coil 64 indicated in FIG. 12 may also be used as the launching coil, as in FIG. 7, where it would replace the coil 24. When using the coil 64 for launching the signal, the sections may be driven by individual transistor amplifiers, as shown in FIG. 10. There, for example, the coil section 64–*a* is connected in the collector circuit of a transistor 76, the gain of which is controlled by a variable resistor 78 in the emitter circuit. The bases of the transistor 76 and other similar transistors are all driven by still another transistor 80 operating as an emitter follower and driven by an input pulse signal applied to the lead 82 to the base of the transistor 80. As shown in FIG. 11, two or more of the coil sections, such as sections 64–*f*, 64–*k*, 64–*m* and 64–*i* may be driven by a single one of the transistors 76, care being taken to connect them in series in the proper sense for providing the sensitivities proportional to the positive and negative portions of the curve 33 in FIG. 12. The connection of several of the coil sections to a single transistor, as in FIGS. 9 and 11, provides for economy and simplicity of adjustment. However, the provision of a separate transistor amplifier for each coil section greatly enlarges the flexibility of the system.

The central portion of the waveform 34, FIG. 4, can be sharpened further, and the whole central portion, including the central positive peak of the two smaller negative peaks which flank it, can be made narrower, by altering the relative amplitudes of the various component frequencies of the signal for giving it a broader band characteristic. Furthermore, this effect can be achieved by constructing the output coils, such as the coils 24 of FIG. 1, to include a band-broadening action in their sensitivity profile.

To this end, the Fourier, or harmonic, component frequencies of the curve 33 in FIG. 4, which depicts the mechanical strain wave in the magnetostrictive ribbon at the output coil in the system of FIG. 1, were computed in a wellknown manner. These components were described by a series of cosine terms of the following form:

$$A_1 \cos (wt+d_1)$$
$$A_2 \cos (2wt+d_2)$$
$$A_3 \cos (3wt+d_3)$$

etc.

In this series the A's specify the relatively amplitudes of the harmonics and the *d*'s the relative phases. The quantities *wt*, 2*wt*, etc., are the component frequencies.

Figure 13:
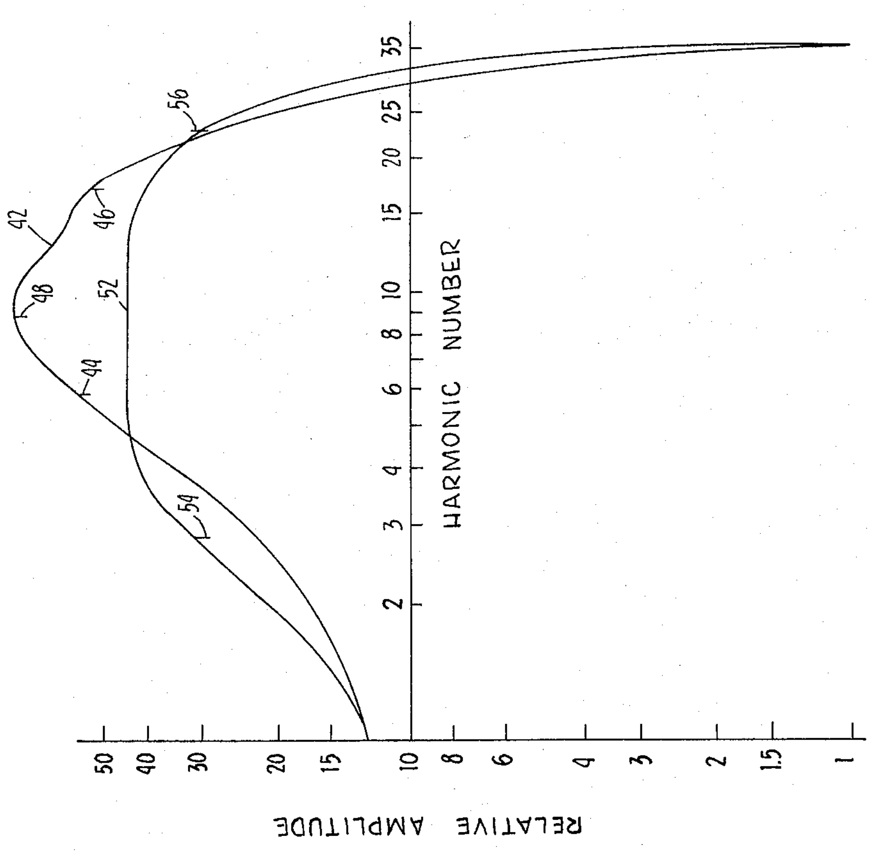
FIG. 13 is a graphical construction showing how the construction of a delay line transducer for broadening the frequency band of a signal is based on frequency spectra.

In curve 42 in FIG. 13, the relative amplitudes, that is, the A's in the foregoing terms are plotted against the harmonic numbers, that is, against the frequency terms *wt*, 2*wt*, etc. Both scales are logarithmic. A plot such as this is known as a frequency spectrum. As is wellknown in the art, the two frequencies 44 and 46 on this plot, for which the power is half the power of the frequency 48 with the peak amplitude, define the so-called band width of the signal. If the signal is modified by reducing the amplitude of the peak portion of the curve, for making the curve more flat-topped, the half-power points will mark a wider frequency band. Accordingly, the curve 52 was drawn as a desirable spectrum for a modified signal. The half-power frequencies of this new spectrum are the frequencies 54 and 56, and the resulting signal has a considerably greater band width.

This modification of the spectrum from the curve 52 was accomplished in the design of the profiled coil as follows: At each component frequency, that is, at each harmonic number, the ratio of the ordinate of curve 52 to that of curve 42 was multiplied by the A term of that component frequency. Thus, a set of new amplitude terms was obtained which can be called $A_{1b}$, $A_{2b}$, $A_{3b}$, etc., and these were substituted in the terms previously given for the Fourier, or harmonic, component frequencies. The new specification for the sensitivity profile of the transducer coil then became:

$$A_{1b} \cos (wt+d_1)$$
$$A_{2b} \cos (2wt+d_2)$$
$$A_{3b} \cos (3wt+d_3)$$

etc.

A new waveform is then synthesized by calculation from this new specification in a known manner and the transducer coil profiled according to this new sensitivity curve just as the coils 24 of FIGS. 1 and 2 were profiled to match the curve 33 of FIG. 4. The output wave obtained with such a transducer coil is similar to that of the curve 34 in FIG. 4 but is narrower and sharper.

The foregoing embodiments are illustrative and the invention is to be limited only to the scope of the following claims.

I claim:

1. In combination in a delay line, two electromechanical magnetostrictive transducers, means for applying a predetermined electric signal to one of said transducers, and means for transmitting an elastic wave between said transducers for carrying a signal from one transducer to the other with a time delay, one of said transducers including a coil having overlying winding portions of unequal length and having a sensitivity that is profiled to vary across it in the direction of travel of said elastic waves thereacross as the amplitude of an elastic wave launched from the other transducer and arriving at said one transducer varies thereacross in the same direction.

2. The combination of claim 1 wherein at least a part of said coil is wound on a bobbin having a stepped winding space.

3. In combination in a delay line, two electromechanical magnetostrictive transducers, means for applying a predetermined electric signal to one of said transducers, and means for transmitting an elastic wave between said transducers for carrying a signal from one transducer to the other with a time delay, one of said transducers having a sensitivity that is profiled to vary across it in the direction of travel of said elastic waves thereacross as the amplitude of an elastic wave launched from the other transducer and arriving at said one transducer varies thereacross in the same direction, said one profiled transducer including a coil that comprises a plurality of coil sections, some of said coil sections being connected to contribute to the output with a polarity opposite that of other such coil sections.

4. In combination in a delay line, two electromechanical transducers, means for applying a predetermined electric signal to one of said transducers, means for transmitting an elastic wave between said transducers for carrying a signal from one transducer to the other with a time delay, one of said transducers having a sensitivity that is profiled to vary across it in the direction of travel of said elastic waves thereacross as the amplitude of an elastic wave launched from the other transducer and arriving at said one transducer varies thereacross in the same direction, said one transducer including at least two signal responsive elements, signal circuit means, and a separate circuit means having an adjustable transmission characteristic for connecting each of said two elements to said signal circuit means.

5. The combination of claim 4 wherein said transducers are magnetostrictive, wherein each signal responsive element includes a separate coil section, wherein said signal circuit means includes signal source means, and wherein a separate one of said circuit means connects said signal source means to each of said two coil sections.

6. The combination of claim 4 wherein said transducers are magnetostrictive, wherein each said signal responsive element includes a separate coil section, and wherein said signal circuit means includes signal output means, and wherein a separate one of said circuit means connects each of said two coil sections to said signal output means.

References Cited by the Examiner

UNITED STATES PATENTS

| | | | |
|---|---|---|---|
| 3,046,501 | 7/1962 | Dell et al. | 330—30 |

OTHER REFERENCES

Scarrott et al., Wire-Type Delay Lines, Proc. Of Inst. of Elect. Engineers, London, Vol. 103, Part B, March 1956, pages 497–508 relied on.

HERMAN KARL SAALBACH, *Primary Examiner.*

R. F. HUNT, *Assistant Examiner.*